(12) United States Patent
Park et al.

(10) Patent No.: US 8,051,157 B2
(45) Date of Patent: Nov. 1, 2011

(54) DISCOVERY APPARATUS AND METHOD

(75) Inventors: Sang Do Park, Seoul (KR); Jun Hyeong Kim, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 903 days.

(21) Appl. No.: 11/744,997

(22) Filed: May 7, 2007

(65) Prior Publication Data
US 2008/0133776 A1    Jun. 5, 2008

(30) Foreign Application Priority Data
Dec. 5, 2006    (KR) ........................ 10-2006-0122497

(51) Int. Cl.
*G06F 15/173* (2006.01)
*G06F 15/16* (2006.01)

(52) U.S. Cl. ................ 709/223; 709/204; 709/227

(58) Field of Classification Search .......... 709/201–205, 709/223–227, 244, 248; 370/254
See application file for complete search history.

(56) References Cited

U.S. PATENT DOCUMENTS

| | | | | |
|---|---|---|---|---|
| 2002/0147771 | A1* | 10/2002 | Traversat et al. | 709/203 |
| 2002/0152299 | A1* | 10/2002 | Traversat et al. | 709/223 |
| 2002/0156875 | A1* | 10/2002 | Pabla | 709/220 |
| 2006/0143295 | A1* | 6/2006 | Costa-Requena et al. | 709/227 |

FOREIGN PATENT DOCUMENTS

| | | |
|---|---|---|
| JP | 10-056473 A | 2/1998 |
| JP | 2002-152280 A | 5/2002 |
| JP | 2003-271480 A | 9/2003 |
| JP | 2004-7671 A | 1/2004 |
| JP | 2004-320766 A | 11/2004 |
| KR | 10-2005-0110527 A | 11/2005 |
| KR | 10-2005-0112804 A | 12/2005 |

OTHER PUBLICATIONS

Edwards et al., Using Speakeasy for Ad Hoc Peer-to-Peer Collaboration, Nov. 20, 2001, retrieved from http://www2.parc.com/csl/projects/speakeasy/papers/speakeasy-cscw02.pdf on Sep. 24, 2010.*

* cited by examiner

*Primary Examiner* — Joon H Hwang
*Assistant Examiner* — Thomas Lee, IV
(74) *Attorney, Agent, or Firm* — Sughrue Mion, PLLC (57) ABSTRACT

A discovery apparatus among a plurality of networks including at least one client includes: a transceiver which transmits and receives shared information and a request message to and from the client within the plurality of networks, the shared information being intrinsic information of the clients; a storage unit which receives the shared information from the transceiver and stores the shared information of the transceiver; and a controller which creates a shared space, which stores the shared information in the storage unit, in accordance with the request message received through the transceiver, and manages the shared information stored in the shared space.

14 Claims, 7 Drawing Sheets

DISCOVERY APPARATUS AND METHOD

CROSS-REFERENCE TO RELATED APPLICATIONS

This application claims priority from Korean Patent Application No. 10-2006-0122497, filed on Dec. 5, 2006, in the Korean Intellectual Property Office, the disclosure of which is incorporated herein by reference.

BACKGROUND OF THE INVENTION

1. Field of the Invention

Methods and apparatuses consistent with the present invention relate to a discovery apparatus and method for discovery between clients within a plurality of networks, and more particularly, a discovery apparatus and method for discovery between clients within a plurality of networks, in which all of clients jointly use intrinsic information of components, such as IP addresses, names, and port numbers of clients, which is required for discovery, in a shared space of a server, thereby discovering clients in other networks and allowing the respective clients to communicate with each other.

2. Description of the Related Art

Internet users should know an address and a port number of a corresponding component to communicate with a component which uses an Internet protocol (IP) address system in the Internet. All of components directly connected to the Internet register, the IP addresses, and names of the components in a domain name server (DNS) to allow other clients to identify the addresses from the names. Also, it is proposed that the components receive port numbers input through given ports.

However, a problem occurs in that it is difficult to discover IP addresses through the DNS in an ad-hoc network. Moreover, in the case that a component has an arbitrary IP address like the ad-hoc network, a problem occurs in that since a component does not always have a single IP address, it is difficult to always maintain the same IP address.

SUMMARY OF THE INVENTION

An aspect of the present invention provides a discovery apparatus and method for discovery between clients within a plurality of networks, in which all of clients jointly use intrinsic information of components, such as IP addresses, names, and port numbers of clients, which is required for discovery, in a shared space of a server, thereby discovering components in other networks.

An aspect of the present invention also provides a discovery apparatus and method for discovery between clients within a plurality of networks, in which components having arbitrary IP addresses and components not registered in a DNS are discovered, and even components already registered in the DNS are discovered independently from the DNS.

According to an aspect of the present invention, there is provided a discovery apparatus among a plurality of networks including at least one client, which comprises: a transceiver which transmits and receives shared information and a request message to and from the clients within the plurality of networks, the shared information being intrinsic information of the clients; a storage unit which receives the shared information from the transceiver and which stores the shared information of the transceiver; and a controller which creates a shared space, and stores the shared information in the storage unit, in accordance with the request message received through the transceiver, and manages the shared information stored in the shared space.

In another aspect of the present invention, there is provided a discovery apparatus supporting discovery among a plurality of networks, which comprises: a user interface provider which receives a user message; a message processor which receives the user message from the user interface provider, which analyzes and processes the received user message, which creates a first control signal and a request message in accordance with the user message, and which transmits the created request message to a certain server; and a shared information management unit which receives the first control signal from the message processor, which acquires and manages the shared information through the message processor in accordance with the first control signal, and which controls a discovery routine, wherein the discovery apparatus is operated by a client included in a first network among the plurality of networks, and the server includes a shared space which stores shared information which is intrinsic information of the client.

BRIEF DESCRIPTION OF THE DRAWINGS

The above and other aspects of the present invention will become apparent and more readily appreciated from the following detailed description, taken in conjunction with the accompanying drawings of which.

DETAILED DESCRIPTION OF THE EXEMPLARY EMBODIMENTS OF THE INVENTION

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

Figure 1:
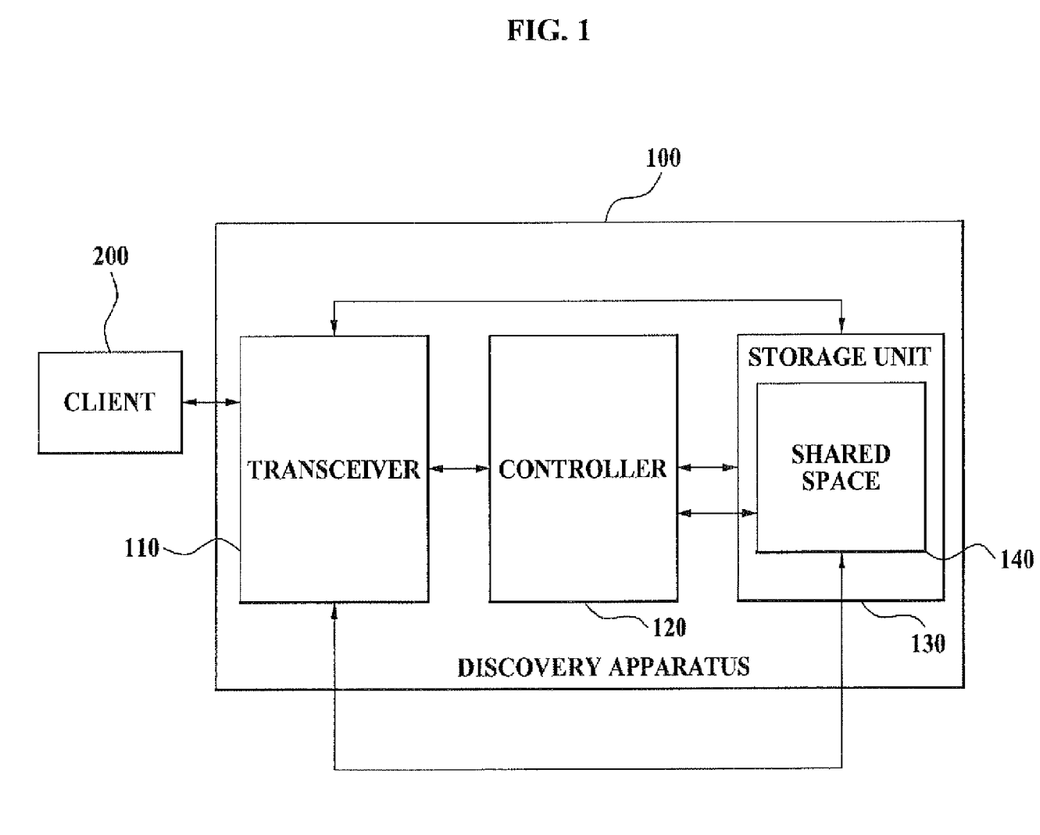
FIG. 1 is a block diagram illustrating a discovery apparatus according to a first exemplary embodiment of the present invention.

FIG. 1 is a block diagram illustrating a discovery apparatus 100 according to a first exemplary embodiment of the present invention.

The discovery apparatus 100 according to the first exemplary embodiment of the present invention includes a transceiver 110, a controller 120, and a storage unit 130. The discovery apparatus 100 may be a server.

First, the transceiver 110 receives shared information from a client 200 within a plurality of networks, wherein the shared information is created by reflecting intrinsic information of the client 200, receives a request message from the client 200, and transmits the shared information requested by the request message to the client 200. The shared information includes intrinsic information, such as IP addresses of all of clients within a network to which the client 200 belongs, names, and their port numbers of all the clients. The shared information may mean both first shared information created by reflecting intrinsic information of clients within a first network among the plurality of networks, and second shared information created by reflecting intrinsic information of clients within a second network among the plurality of networks.

The request message may include at least one of a shared space create message requesting creation of a shared space 140 in a storage unit 130, a shared space join message requesting joining in the shared space 140, a shared information transmission request message requesting transmission of the shared information, a shared space leave message requesting leave from the shared space 140, and a shared space delete message requesting deletion of the shared space 140.

Furthermore, the storage unit 130 serves to receive shared information from the transceiver 110, store the received shared information in the shared space 140, and provide the stored shared information to a controller 120 under the control of the controller 120. In this case, the storage unit 130 includes a client database which stores a name of a client that accesses a server.

Meanwhile, the controller 120 creates the shared space 140, which stores shared information in the storage unit 130, in accordance with a request message received through the transceiver 110, and manages the shared information. For example, the controller 120 can control storage, transmission, and deletion of the shared information. Also, the controller 120 can control all of clients, that join in the shared space, to transmit the shared information updated due to storage and deletion by the transceiver 110.

The aforementioned discovery apparatus shown in FIG. 1 can be implemented in the form of network interface included in the server.

Figure 2:
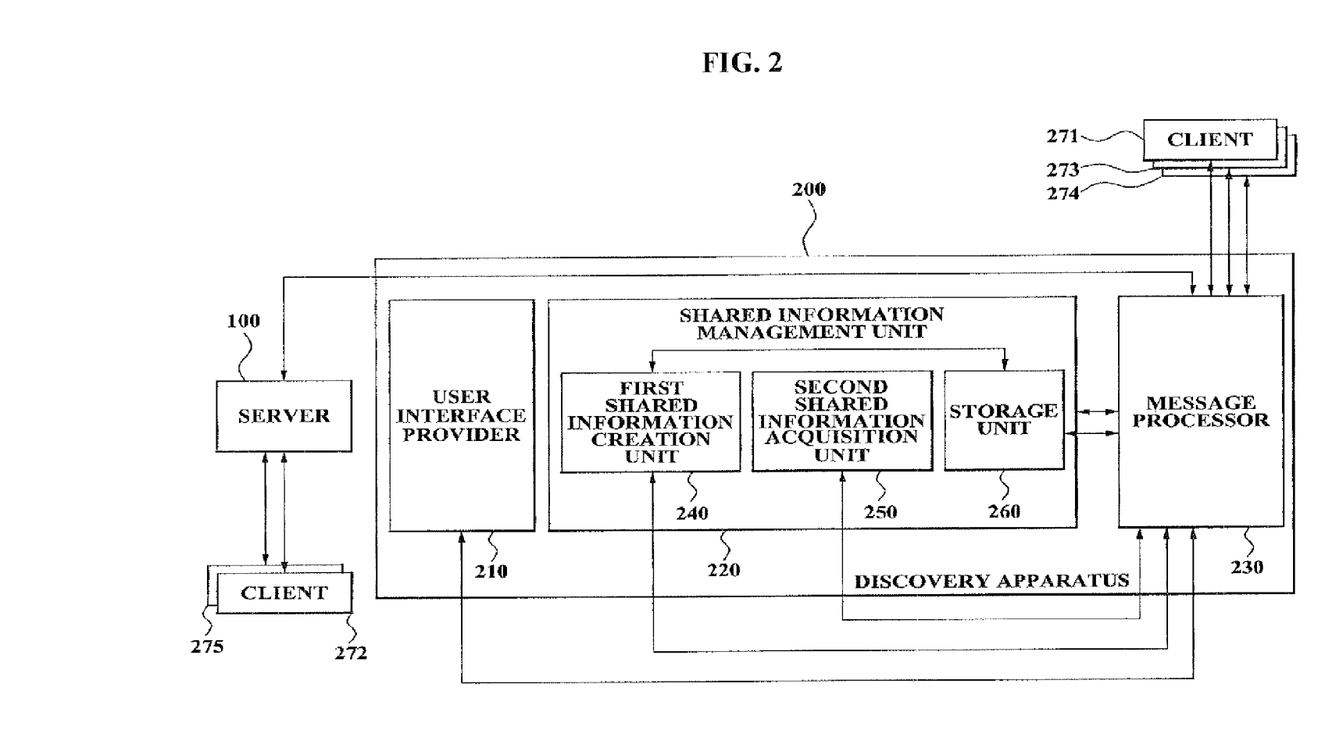
FIG. 2 is a block diagram illustrating a discovery apparatus according to a second exemplary embodiment of the present invention.

FIG. 2 is a block diagram illustrating a discovery apparatus 200 according to a second exemplary embodiment of the present invention. The discovery apparatus 200 may be a client.

The discovery apparatus 200 according to the second exemplary embodiment of the present invention includes a user interface provider 210, a shared information management unit 220, and a message processor 230.

First, the user interface provider 210 receives a user message from a user, wherein the user message is requested from the discovery apparatus 200 which is a client to request use of the shared space 140 within the discovery apparatus 100 which is a server, and outputs the received user message to the message processor 230. In this case, use of the shared space 140 may mean join providing shared information to the shared space 140 to jointly use the shared information of the discovery apparatus 200 within the shared space 140 of the server 100, leave requesting deletion of client information of the discovery apparatus 200 within the shared space 140 of the server as a corresponding component leaves a corresponding network, and delete requesting deletion of the shared space 140 from the server 100.

Also, the user interface provider 210 includes a display provider which displays, to the user, a list of clients included in the plurality of networks, and a list of the shared space 140. The display provider is described in detail with reference to FIG. 7.

Figure 7:
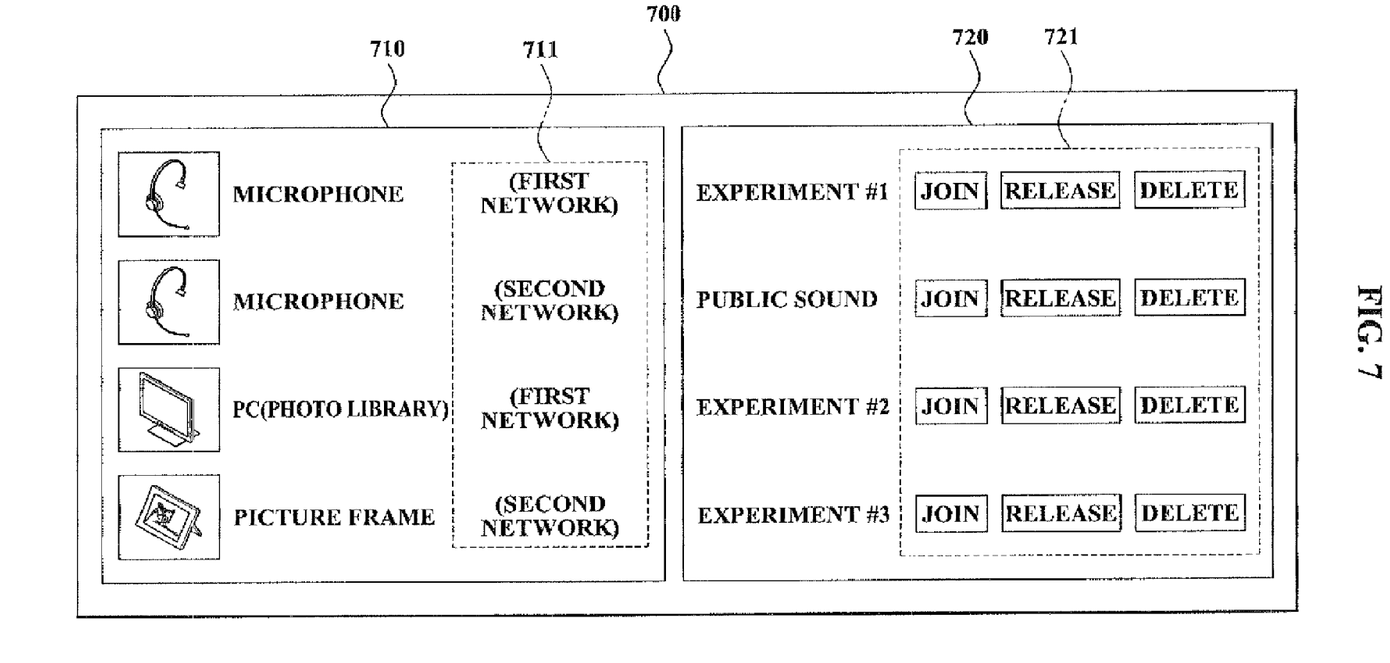
FIG. 7 is a diagram illustrating a display provider of a user interface provider according to an exemplary embodiment of the present invention.

FIG. 7 is a diagram illustrating a display provider of a user interface provider according to an exemplary embodiment of the present invention. Referring to FIG. 7, the display provider 700 displays, to a user, a client list 710 of clients included in a plurality of networks, and a shared space list 720 of the shared space 140.

The client list 710 includes the clients included in the plurality of networks corresponding to shared information stored in the shared space 140. As illustrated in FIG. 7, the clients included in the plurality of networks corresponding to shared information stored in the shared space 140 are included in the client list 710. The plurality of networks includes a first network and a second network included in the discovery apparatus 200, such as a microphone of the first network and a microphone of the second network, or a personal computer (PC) of the first network and a picture frame of the second network.

The shared space list 720 includes a list of the shared space 140 which performs creating, deleting, joining, and leaving from the shared space 140 using a user message, and the user message is inputted in the user interface provider 210 from the user using the display provider 700. For this, the display provider 700 includes a message creator 721 which creates the user message. The message creator 721 creates a message requesting creating, deleting, joining, and leaving from the shared space 140. Referring to FIG. 7, a predetermined control button for creating the user message is provided for the user. The client list 710 and the shared space list 720 are not limited to the above-described specific exemplary embodiments, and it would be appreciated by those skilled in the art that changes may be made to the above embodiments.

The message processor 230 receives the user message from the user interface provider 210, receives a update message from the server 100, analyzes and processes the received user message and the received update message, creates a first control signal and a request message in accordance with the processed result of the user message, outputs the first control signal to the shared information management unit 220, transmits the request message to the server 100, receives second shared information according to the request message, and outputs the second shared information to the shared information management unit 220. Specifically, the message processor 230 receives the user message through the user interface provider 210, the user message requesting any one of creating, deleting, joining, and leaving from the shared space 140, and transmits any one of a create, delete, join, and leave message of the shared space 140 to the server 100 along with a name of the shared space 140.

Furthermore, the shared information management unit 220 serves to receive the first control signal and the second shared information from the message processor 230 and controls transmission, reception, management, and discovery operation of the first shared information and the second shared information in accordance with the first control signal. In this case, the shared information management unit 220 includes a first shared information creation unit 240, a second shared information acquisition unit 250, and a storage unit 260.

The first shared information creation unit 240 controls a multicast message, which requests intrinsic information of all of clients within the first network, to be broadcasted to all of clients through the message processor 230 in accordance with the first control signal, receives intrinsic information according to the multicast message from all of clients within the first network through the message processor 230, and creates the first shared information using the received shared information. Also, the first shared information creation unit 240 controls the first shared information to be transmitted to the server 100 or the client 200 through the message processor 230.

The second shared information acquisition unit 250 receives the second shared information from the message processor 230, performs the discovery operation through the received second shared information, and outputs the second shared information to the storage unit 260.

The second shared information includes intrinsic information of clients within the second network. Since the intrinsic information of clients within the second network is similar to that within the aforementioned first network, a detailed description thereof will be omitted.

The storage unit 260 receives the first shared information and the second shared information from the first shared information creation unit 240 and the second shared information acquisition unit 250 and stores the first shared information and the second shared information therein.

The discovery apparatus shown in FIG. 2 can be implemented in the form of network interface included in the client.

Figure 3:
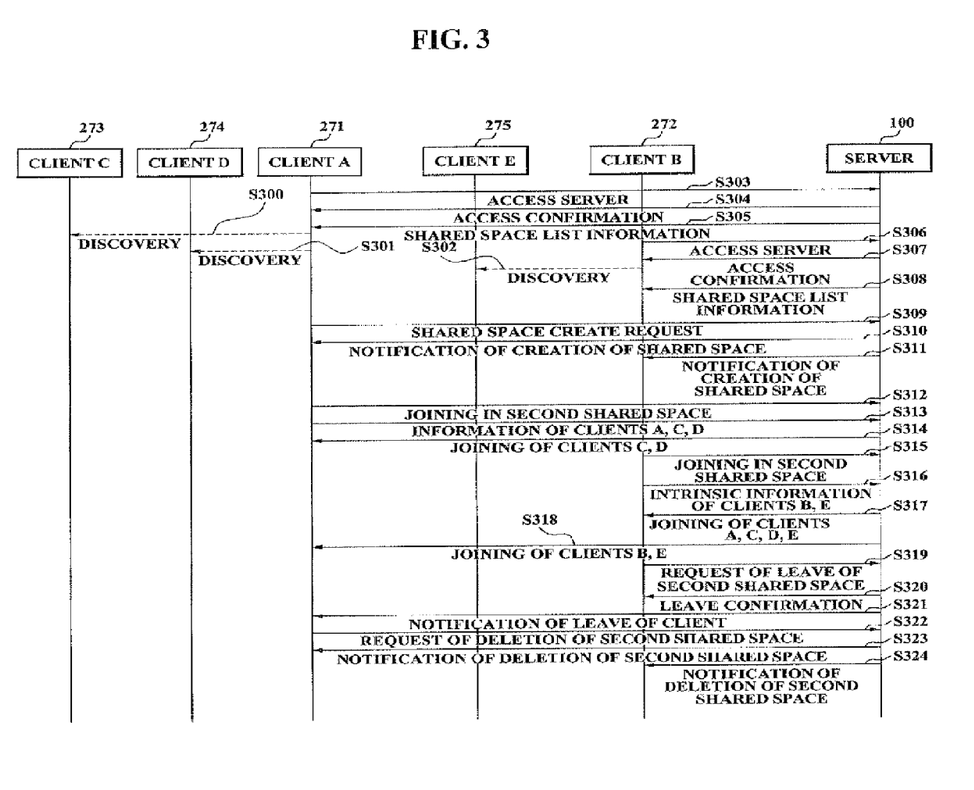
FIG. 3 is an operational flowchart illustrating the operation of a discovery system according to an exemplary embodiment of the present invention.

FIG. 3 is an operational flowchart illustrating the operation of a discovery system according to an embodiment of the present invention.

Supposing that a client C 273, a client D 274, and a client A 271 belong to the first network while a client E 275 and a client B 272 belong to the second network, the client A 271 can discover the client C 273 and the client D 274 using a multicast mode (S300 and S301) while the client B 272 can discover the client E 275 using the multicast mode (S302). In this case, the discovery operation can be performed independently from access (S303 and S307) to the server, and intrinsic information of the clients is collected through the discovery operation.

The client A 271 accesses the server 100 (S303) and receives an access confirmation message from the server 100 (S304). Then, the client A 271 acquires shared space list information from the server 100 (S305).

Also, the client B 272 accesses the server 100 (S306) and receives an access confirmation message from the server 100 (S307). Then, the client B 272 acquires shared space list information from the server 100 (S308).

To create a new shared space, the client A 271 transmits a name of the new shared space to be created to the server 100 along with a shared space create message (S309).

The server creates the new shared space and notifies the client A 271 and the client B 272 that the shared space has been created (S310 and S311).

The client A 271 transmits the first shared information including intrinsic information of the client A 271, the client C 273, and the client D 274 to the server 100 along with a shared space join message for joining in the second shared space (S312 and S313).

The server 100 additionally stores the client C 273 and the client D 274 as the shared information of the shared space, and transmits a join confirmation message of the client C 273 and the client D 274 to the client A 271 (S314).

Furthermore, the client B 272 transmits the second shared information including intrinsic information of the client B 272 and the client E 275 to the server 100 along with a shared space join message for joining in the shared space (S315 and S316).

Afterwards, the client B 272 can obtain the first shared information including intrinsic information of the client A 271, the client C 273, the client D 274, and the client E 275 along with the fact that the client A 271, the client C 273, the client D 274, and the client E 275 have been already joined (S317).

Also, the server 100 notifies the client A 271 that the client B 272 and the client E 275 have been joined in the shared space (S318).

When the client B 272 makes a request to the server 100 to leave the shared space (S319), the server 100 notifies the client B 272 and the client A 271 that the client B 272 has left the shared space (S320 and S321).

Furthermore, when the client A 271 makes a request to the server 100 to delete the shared space (S322), the server 100 deletes the shared space and transmits updated information relating to deletion of the shared space to the client A 271 and the client B 272 (S323 and S324).

Figure 4:
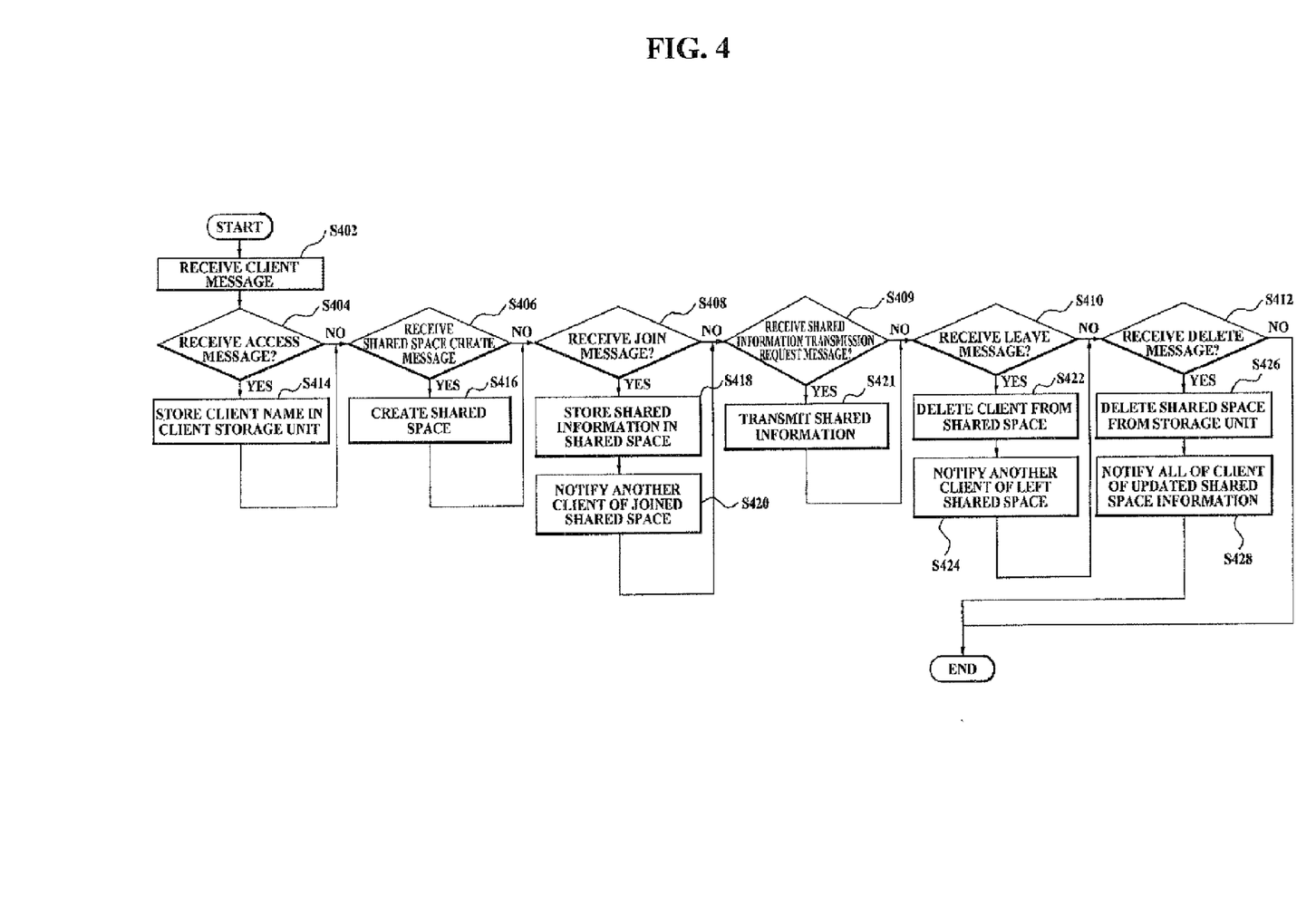
FIG. 4 is an operational flowchart illustrating a discovery method of a server according to an exemplary embodiment of the present invention.

FIG. 4 is an operational flowchart illustrating a discovery method of the server according to the present invention.

First, when the server 100 is implemented, the server 100 opens a required port and receives a message of the client 200 (S402). In this case, the client 200 may be a first client belonging to the first network among the plurality of networks.

The controller 120 of the server 100 checks whether a message received from the client 200 through the transceiver 110 is a server access message (S404).

Also, when the received message is not the server access message, the controller 120 of the server 100 checks whether the message received from the client through the transceiver 110 is the shared space create message (S406).

Also, when the received message is not the shared space create message, the controller 120 of the server 100 checks whether the received message is the shared space join message (S408).

Furthermore, when the received message is not the shared space join message, the controller 120 of the server 100 checks whether the received message is the shared information transmission request message (S409).

Also, when the received message is not the shared information transmission request message, the controller 120 of the server 100 checks whether the received message is the shared space leave message (S410).

Also, when the received message is not the shared space leave message, the controller 120 of the server 100 checks whether the received message is the shared space delete message (S412).

Also, when the received message is not the shared space delete message, the controller 120 of the server 100 ends processing of the method.

Furthermore, when the received message is the server access message, the controller 120 of the server 100 stores the name of the client in the storage unit 130 (S414), and then advances to the checking operation (S406) of the shared space create message.

Also, when the received message is the shared space create message, the controller 120 of the server 100 creates the shared space 140 (S416), and then advances to the checking operation (S408) of the shared space join message.

Furthermore, when the received message is the shared space join message, the controller 120 of the server 100 receives the shared information from the message processor 230 of the client 200, stores the received shared information in the shared space 140 (S418), notifies another client of the joined shared space (S420), and then advances to the checking operation (S409) of the shared information transmission request message. In this case, the shared information may be at least any one of the first shared information created by the intrinsic information of all of clients within the first network among the plurality of networks and the second shared information created by the intrinsic information of all of clients within the second network among the plurality of networks.

Furthermore, when the received message is the shared information transmission request message, the controller 120 of the server 100 transmits the shared information, which is received from the message processor 230 of the client 200 to the shared space (S421), and then advances to the checking operation (S410) of the shared space leave message.

Also, when the received message is the shared space leave message, the controller 120 of the server 100 deletes the name of the client from the shared space (S422), notifies another client of the left shared space (S424), and then advances to the checking operation (S412) of the shared space delete message.

Furthermore, when the received message is the shared space delete message, the controller 120 of the server 100 deletes the shared space 140 from the storage unit 130 (S426), and notifies all of clients of the updated shared space information (S428).

Figure 5:
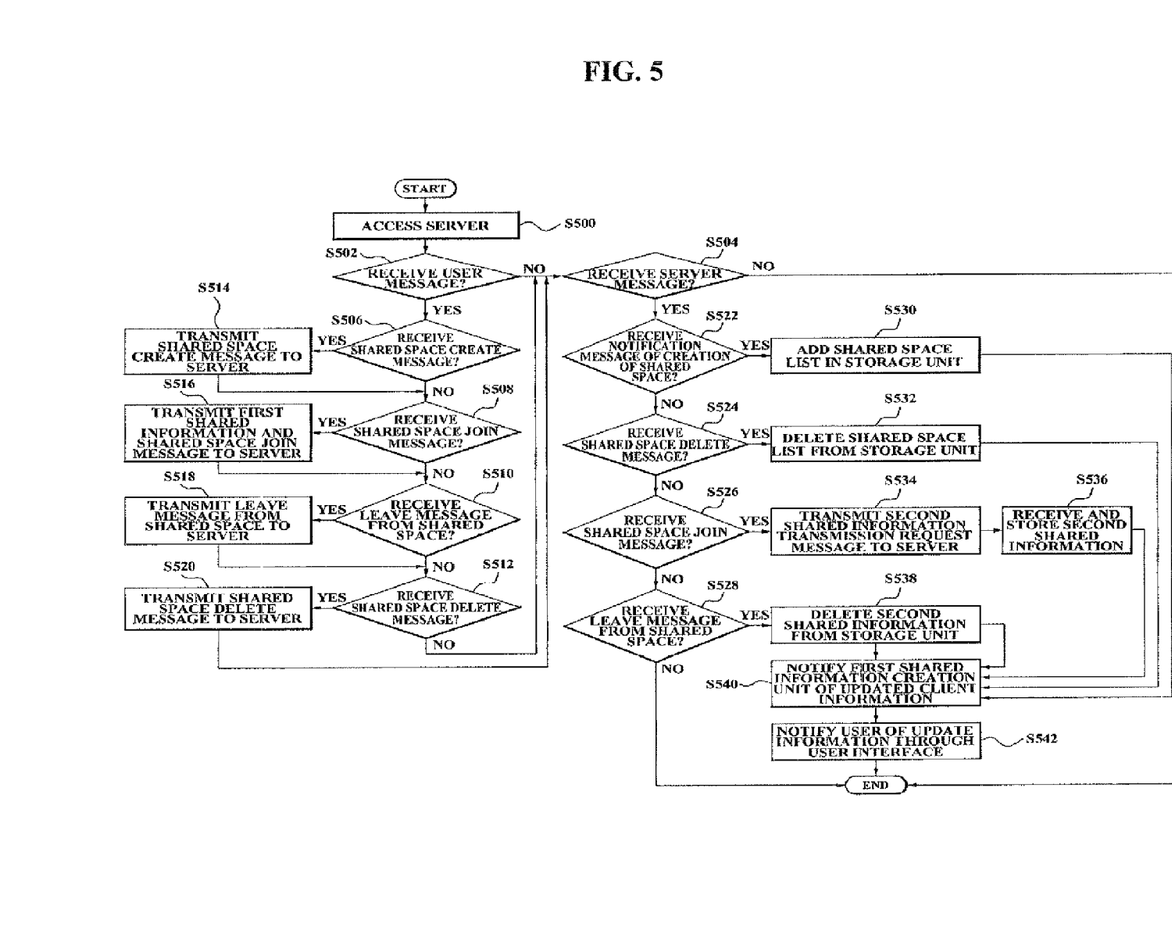
FIG. 5 is an operational flowchart illustrating a discovery method of a client according to an exemplary embodiment of the present invention.

FIG. 5 is an operational flowchart illustrating a discovery method of the client according to an exemplary embodiment of the present invention.

First, the client accesses server 100 (S500).

The client receives a message, and checks whether the received message is a user message (S502).

When the received message is not the user message, the client checks whether the received message is a server message (S504).

When the received message is not the server message, the client ends the operation.

Also, when the client receives the user message from the user interface provider 210 (S502), the client checks whether the user message is a message requesting creation of the shared space (S506).

When the user message is not the message requesting creation of the shared space, the client checks whether the user message is a message requesting joining in the shared space (S508).

When the user message is not the message requesting joining in the shared space, the client checks whether the user message is a message requesting to leave from the shared space (S510).

Furthermore, when the user message is not the message requesting to leave from the shared space, the client checks whether the user message is a message requesting deletion of the shared space (S512).

Also, when the user message is not the message requesting deletion of the shared space, the client advances to the checking operation (S504) of the server message.

Furthermore, when the user message is the message requesting creation of the shared space, the client transmits the shared space create message to the server (S514), and then advances to the checking operation (S508).

When the user message is the message requesting joining in the shared space, the client transmits the first shared information, which is the intrinsic information of all of clients within the first network, and the shared space join message to the server (S516), and then advances to the checking operation (S510).

Furthermore, when the user message is the message requesting to leave from the shared space, the client creates the shared space leave message, transmits the created shared space leave message to the server (S518), and then advances to the checking operation (S512).

Also, when the user message is the message requesting deletion of the shared space, the client creates the shared space delete message, transmits the created shared space delete message to the server (S520), and then advances to the checking operation (S504).

Furthermore, when the received message is the server message, the client checks whether the server message is a notification message of creation of the shared space (S522). When the server message is not the notification message of creation of the shared space, the client checks whether the server message is a notification message of deletion of the shared space (S524).

Furthermore, when the server message is not the notification message of deletion of the shared space, the client checks whether the server message is a notification message of joining in the shared space (S526).

Also, when the server message is not the notification message of joining in the shared space, the client checks whether the server message is a notification message of leave from the shared space (S528).

When the server message is not the notification message of leave from the shared space, the client ends processing of the method.

Also, when the server message is the notification message of creation of the shared space, the client adds a new shared space list received as the shared space is created in the storage unit 260 (S530), and then advances to an operation of update information transmission (S540) described later.

Furthermore, when the server message is the notification message of deletion of the shared space, the client deletes the corresponding shared space list from the storage unit 260 (S532), and then advances to the operation of update information transmission (S540).

Also, when the server message is the notification message of joining in the shared space, the client transmits the shared information transmission request message to the server 100 (S534), receives the second shared information from the server 100, stores the second shared information in the storage unit 260 (S536), and then advances to the operation of update information transmission (S540).

Furthermore, when the server message is the notification message of leave from the shared space, the client deletes the second shared information from the storage unit 260 (S538), and then advances to the operation of update information transmission (S540).

Also, the message processor 230 notifies all of clients 271, 273 and 274 of the updated shared information stored in the storage unit 260 (S540).

Afterwards, the client notifies the user of new information according to the updated shared information through the user interface provider 210 (S542). Next, the client ends processing of the method.

Figure 6:
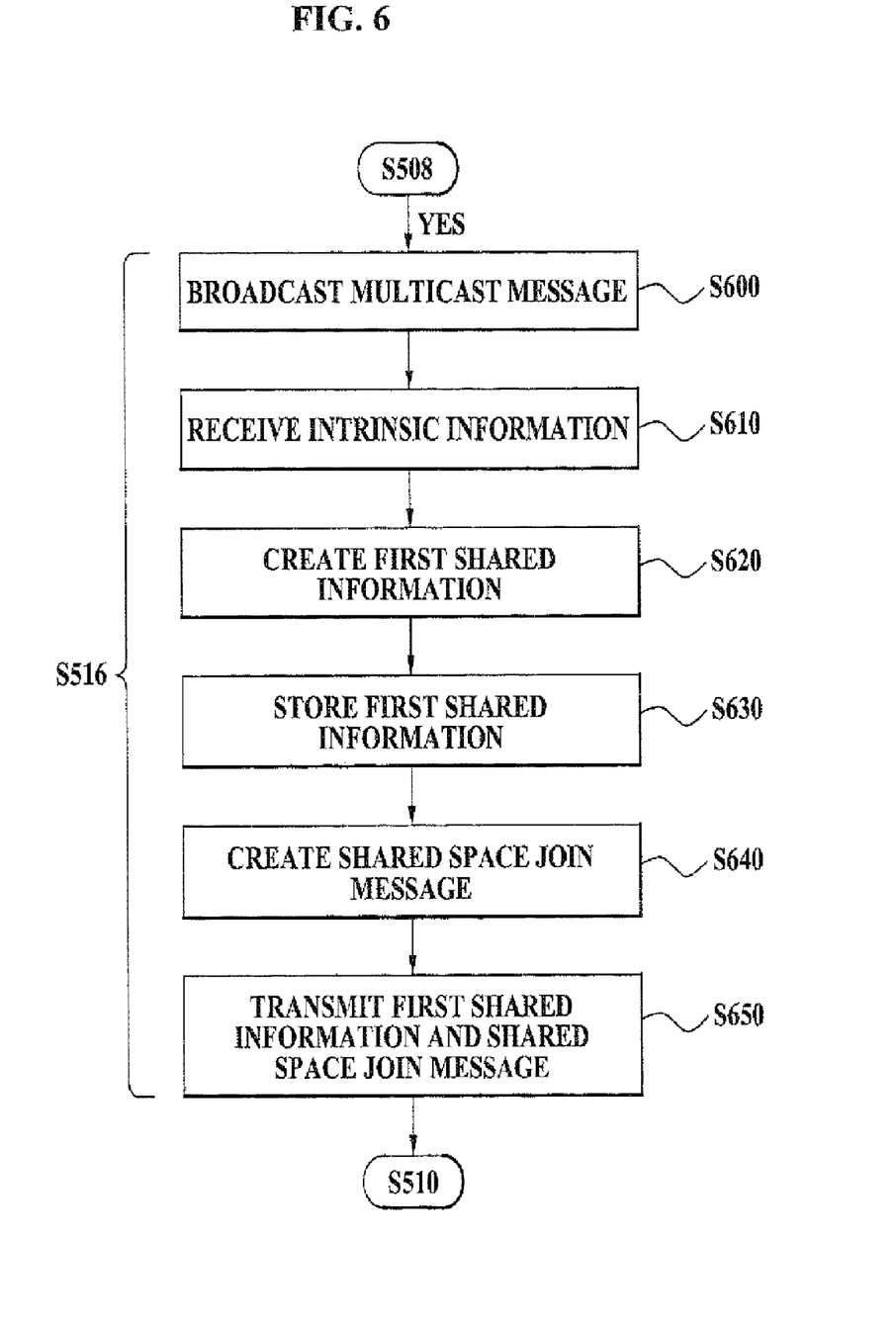
FIG. 6 is an operational flowchart illustrating a method for creating shared information of a client according to an exemplary embodiment of the present invention.

FIG. 6 is an operational flowchart illustrating the detailed operation of the method for creating the shared information of the client of FIG. 4.

First, when the client receives the shared space join message from the user interface provider 210 (S508), the client broadcasts the multicast message requesting the first shared information which is the intrinsic information of all of clients within the first network (S600), receives the intrinsic information to correspond to the multicast message (S610), and creates the first shared information using the intrinsic information (S620).

Afterwards, the client stores the created first shared information in the storage unit 260 (S630).

Furthermore, the client creates the shared space join message in the message processor 230 (S640), and transmits the first shared information and the shared space join message to the server 100 (S650).

As described above, the discovery apparatus and method according to the present invention have the following aspects.

The intrinsic information of all of components within the network to which the client joining in the shared space belongs is jointly used in the shared space of the server, thereby discovering components in other networks and allowing the respective components to communicate with each other.

Also, in the case that IP addresses, names, and port numbers cannot be identified as in the ad-hoc network, a component having an arbitrary IP address and a component not registered in the DNS can be discovered using the shared space of the server.

Finally, since the discovery apparatus of the present invention is used even for the component registered in the DNS, independently from the DNS, complexity of the discovery procedure can be reduced.

In addition, the exemplary embodiments can be implemented by a computer programmable recording medium having instructions stored therein for allowing a computer to perform the discovery method.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A discovery apparatus among a plurality of networks including a plurality of clients, the discovery apparatus comprising:
    a transceiver which receives a shared space create message requesting creation of a shared space from a first client within a first network of the plurality of networks, transmits a notification of creation of the shared space to the first client within the first network and a second client within a second network of the plurality of network, receives first shared information from the first client and second shared information from the second client, the first shared information being created by intrinsic information of each of a plurality of clients within the first network and second shared information being created by intrinsic information of each of a plurality of clients within the second network of the plurality of networks;
    a storage unit which receives the first shared information and the second shared information from the transceiver and stores the first shared information and the second shared information received from the transceiver; and
    a controller which creates the shared space in accordance with the shared space create message received through the transceiver, controls to store the first shared information and the second shared information in the shared space, and controls to transmit shared information updated in the storage unit to all clients joining in the shared space,
    wherein the intrinsic information of each of the plurality of clients within the first network is collected by using a multicast message broadcasted onto the first network from the first client and comprises an IP address and a port number of a corresponding client of the plurality of clients within the first network, and the intrinsic information of each of the plurality of clients within the second network is collected by using a multicast message broadcasted onto the second network from the second client of the plurality of clients within the second network and comprises an IP address and a port number of a corresponding client of the plurality of clients within the second network, and
    wherein the first and second networks are Ad hoc networks.

2. The discovery apparatus of claim 1, wherein the server further receives at least one of a shared space join message requesting joining in the shared space, a shared information transmission request message requesting transmission of the shared information, a shared space leave message requesting to leave from the shared space, and a shared space delete message requesting deletion of the shared space.

3. A network interface comprising the discovery apparatus of claim 1.

4. A discovery apparatus supporting discovery among a plurality of networks, the discovery apparatus comprising:
    a user interface provider which receives a user message;
    a message processor which receives the user message from the user interface provider, analyzes and processes the received user message, creates a first control signal and a request message in accordance with the user message, and transmits the created request message to a certain server; and
    a shared information management unit which receives the first control signal from the message processor, acquires and manages shared information through the message processor in accordance with the first control signal, and controls a discovery routine,
    wherein the shared information management unit comprises:
    a first shared information creation unit which creates a multicast message for requesting intrinsic information of each of a plurality of clients within a first network among the plurality of networks in accordance with the first control signal, broadcasts the created multicast message through the message processor onto the first network, receives the intrinsic information corresponding to the multicast message through the message processor, and creates first shared information using the received intrinsic information, the first shared information being included in the shared information;
    a second shared information acquisition unit which receives second shared information from the server through the message processor, the second shared information being included the shared information; and
    a storage unit which receives the first shared information and the second shared information from the message processor and stores the first shared information and the second shared information received from the message processor in the storage unit,
    wherein the discovery apparatus is operated by a first client included in the first network among the plurality of networks, and the server includes a shared space for storing the first shared information and the second shared information, and
    wherein the intrinsic information of each of the plurality of clients within the first network comprises an IP address and a port number of a corresponding client of the plurality of clients within the first network, and the second shared information is created by intrinsic information of each of a plurality of clients within a second network among the plurality of networks and the intrinsic information of each of the plurality of clients within the second network is collected by using a multicast message broadcasted onto the second network from a second client within the second network, and
    wherein the first and second networks are Ad hoc networks, wherein the message processor creates a shared space create message requesting creation of the shared space as the request message, transmits the created shared space create message to the server, receives a notification of creation of the shared space transmitted from the server to the first client and the second client, transmits the first shared information to the server in response to the notification of creation of the shared space.

5. The discovery apparatus of claim 4, wherein the user message comprises a message requesting creation of the shared space, a message requesting deletion of the shared space, a message requesting joining in the shared space, and a message requesting to leave from the shared space.

6. The discovery apparatus of claim 4, wherein the user interface provider comprises a display provider which displays, to a user, a client list of clients included in the plurality of networks, and a shared space list of the shared space, and the user message is inputted in the user interface provider from the user using the display provider.

7. The discovery apparatus of claim 6, wherein the client list includes the clients included in the plurality of networks corresponding to the shared information stored in the shared space.

8. The discovery apparatus of claim 6, wherein the display provider includes a message creator which creates the user message, and the message creator creates a message requesting creation of the shared space, deletion of the shared space, joining in the shared space, and leaving the shared space.

9. The discovery apparatus of claim 4, wherein the message processor further creates at least one of a shared space join message requesting joining in the shared space, a shared information transmission request message requesting transmission of the shared information, a shared space leave message requesting leave from the shared space, and a shared space delete message requesting deletion of the shared space.

10. A network interface comprising the discovery apparatus of claim 4.

11. A discovery method among a plurality of networks including a plurality of clients, the discovery method comprising:
receiving a shared space create message requesting creation of a shared space from a first client within a first network of the plurality of networks;
creating the shared space in accordance with the shared space create message;
transmitting a notification of creation of the shared space to the first client and a second client within a second network of the plurality of networks;
receiving a shared space join message and a second shared information from the second client within the second network of the plurality of networks, the shared space join message requesting joining in the shared space, and the second shared information being created by intrinsic information of each of a plurality of clients within the second network, the intrinsic information being collected by using a multicast message broadcasted onto the second network from the second client;
storing the second shared information in the shared space;
receiving a shared space join message and first shared information from the first client, the first shared information being created by intrinsic information of each of a plurality of clients within the first network, the intrinsic information being collected by using a multicast message broadcasted onto the first network from the first client;
receiving a shared information transmission request message from the first client, the shared information transmission request message requesting transmission of the second shared information; and
transmitting the second shared information to the first client in accordance with the shared information transmission request message,
wherein the intrinsic information of each of the plurality of clients within the first network comprises an IP address and a port number of a corresponding client of the plurality of clients within the first network, and the intrinsic information of each of the plurality of clients within the second network comprises an IP address and a port number of a corresponding client of the plurality of clients within the second network, and
wherein the first and second networks are Ad hoc networks.

12. A non-transitory computer programmable recording medium having instructions stored therein for allowing a computer to perform the discovery method of claim 11.

13. A discovery method among a plurality of networks including a plurality of clients, the discovery method comprising:
receiving a user message;
broadcasting a multicast message onto a first network in accordance with the received user message, the multicast message requesting first network intrinsic information of each of a plurality of clients within the first network among the plurality of networks, receiving the first network intrinsic information corresponding to the multicast message, and creating first shared information using the first network intrinsic information;
storing the first shared information;
transmitting a shared space create message requesting creation of a shared space to the server;
receiving a notification of creation of the share space from the server;
transmitting a shared space join message and the first shared information to the server, the shared space join message requesting joining in the shared space;
transmitting a shared information transmission request message to the server, the shared information transmission request message requesting second shared information created by reflecting second network intrinsic information of each of a plurality of clients within a second network among the plurality of networks, the second network intrinsic information being collected by using a multicast message broadcasted onto the second network from a second client within the second network;
receiving the second shared information from the server;
storing the second shared information; and
discovering the clients within the second network using the second shared information,
wherein the discovery method is operated by a first client within the first network and the first network intrinsic information comprises an IP address and a port number of a corresponding client of the plurality of clients within the first network and the second network intrinsic information comprises an IP address and a port number of a corresponding client of the plurality of clients within the second network, and
wherein the first and second networks are Ad hoc networks, and wherein the notification of creation of the shared space is transmitted form the server to the first and second client.

14. A discovery method for discovering among a plurality of networks, the plurality of networks including a server, a first network communicating with the server and including a first client, and a second network including a second client, the discovery method comprising:

receiving a user message through the first client;
broadcasting a multicast message onto the first network in accordance with the received user message, the multicast message requesting first network intrinsic information of each of a plurality of clients within the first network through the first client, receiving the first network intrinsic information corresponding to the multicast message, and creating first shared information using the first network intrinsic information;
storing the first shared information through the first client;
transmitting a shared space create message to the server through the first client, the shared space create message requesting creation of a shared space;
creating the shared space by the server;
transmitting a notification of creation of the shared space from the server to the first client and the second client;
transmitting a shared space join message and the first shared information to the server through the first client, the shared space join message requesting joining in the shared space;
storing the first shared information received from the first client in the shared space by the server;
transmitting a shared space join message to the server by the second client;
receiving second shared information from the second client through the server, the second shared information being created by second network intrinsic information of each of a plurality of clients within the second network, the second network intrinsic information being collected by using a multicast message broadcasted onto the second network from the second client;
storing the second shared information in the shared space through the server;
transmitting a shared information transmission request message to the server through the second client, the shared information transmission request message requesting transmission of the first shared information;
transmitting the first shared information to the second client through the server;
receiving the first shared information of the second client from the server;
storing the first shared information received from the server, through the second client; and
discovering the first client within the first network using the first shared information, through the second client,
wherein the first network intrinsic information comprises an IP address and a port number of a corresponding client of the plurality of clients within the first network and the second network intrinsic information comprises an IP address and a port number of a corresponding client of the plurality of clients within the second network, and
wherein the first and second networks are Ad hoc networks.

* * * * *